(12) United States Patent
Hsu et al.

(10) Patent No.: US 9,451,305 B2
(45) Date of Patent: Sep. 20, 2016

(54) METHOD, COMPUTER READABLE STORAGE MEDIUM, AND INTRODUCING AND PLAYING DEVICE FOR INTRODUCING AND PLAYING MEDIA

(71) Applicant: WISTRON CORP., New Taipei (TW)

(72) Inventors: Chien-Yeh Hsu, New Taipei (TW); Po-Hsu Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 14/172,878

(22) Filed: Feb. 4, 2014

(65) Prior Publication Data
US 2014/0289751 A1 Sep. 25, 2014

(30) Foreign Application Priority Data
Mar. 21, 2013 (TW) .............................. 102110099 A

(51) Int. Cl.
| | |
|---|---|
| H04N 7/16 | (2011.01) |
| G06F 3/00 | (2006.01) |
| G06F 13/00 | (2006.01) |
| H04N 5/445 | (2011.01) |
| H04N 21/2543 | (2011.01) |
| H04N 21/472 | (2011.01) |
| H04N 21/81 | (2011.01) |

(52) U.S. Cl.
CPC .... *H04N 21/2543* (2013.01); *H04N 21/47211* (2013.01); *H04N 21/8126* (2013.01)

(58) Field of Classification Search
USPC ............. 725/1, 5, 27, 37, 38, 41, 44, 45, 56
See application file for complete search history.

(56) References Cited

U.S. PATENT DOCUMENTS

| | | | |
|---|---|---|---|
| 5,833,470 A * | 11/1998 | Harrison ................ | G09B 5/065 348/552 |
| 8,266,648 B2 | 9/2012 | Olague et al. | |
| 2006/0112352 A1 | 5/2006 | Tseng et al. | |
| 2007/0004332 A1* | 1/2007 | Kaiser ................ | G06Q 30/0601 455/3.04 |

(Continued)

FOREIGN PATENT DOCUMENTS

| | | |
|---|---|---|
| CN | 101409800 A | 4/2009 |
| CN | 101523870 A | 9/2009 |

(Continued)

OTHER PUBLICATIONS

The office action of the corresponding Taiwanese application issued on May 6, 2015 and its partial English translation.

*Primary Examiner* — Brian T Pendleton
*Assistant Examiner* — Alexander Gee
(74) *Attorney, Agent, or Firm* — CKC & Partners Co., Ltd.

(57) ABSTRACT

A method for introducing and playing a media is disclosed, in which the method is implemented through a display device that is capable of linking to a network. In the method, detection is performed to determine whether a display of the display device shows a channel preview frame, and a plurality of preliminary previews are automatically and sequentially played when the channel preview frame is showing on the display. Further, detection is performed to determine whether a user selects one of the preliminary previews, and the user is provided with options of channel subscribing or detailed preview when the user selects one of the preliminary previews. Next, a fee paying procedure is executed when the user chooses to subscribe to the channel, and a channel information of the channel subscribed to is set.

14 Claims, 3 Drawing Sheets

(56) References Cited

U.S. PATENT DOCUMENTS

| | | | | |
|---|---|---|---|---|
| 2007/0186180 A1* | 8/2007 | Morgan | ............ | H04N 5/44543 715/779 |
| 2009/0060450 A1* | 3/2009 | Daniels | ........................... | 386/68 |
| 2009/0199241 A1* | 8/2009 | Unger | ................ | H04N 5/44543 725/41 |
| 2010/0306708 A1* | 12/2010 | Trenz | .................... | G06F 3/0482 715/853 |
| 2011/0321072 A1* | 12/2011 | Patterson | ......... | H04N 21/44222 725/5 |
| 2012/0026409 A1* | 2/2012 | Higuchi | ............. | H04N 21/4126 348/734 |
| 2012/0054794 A1* | 3/2012 | Kim | ...................... | G06F 3/0346 725/38 |
| 2014/0081954 A1* | 3/2014 | Elizarov | ............. | H04N 21/252 707/722 |

FOREIGN PATENT DOCUMENTS

| | | |
|---|---|---|
| TW | 530216 B | 5/2003 |
| TW | 200618633 A | 6/2006 |
| TW | 201206193 | 2/2012 |
| WO | 0248903 A1 | 6/2002 |
| WO | 2008045858 A1 | 4/2008 |

\* cited by examiner

METHOD, COMPUTER READABLE STORAGE MEDIUM, AND INTRODUCING AND PLAYING DEVICE FOR INTRODUCING AND PLAYING MEDIA

RELATED APPLICATIONS

This application claims priority to Taiwanese Application Serial Number 102110099, filed Mar. 21, 2013, which is herein incorporated by reference.

BACKGROUND

1. Field of Disclosure

The present disclosure relates to a method for introducing and playing a media. More particularly, the present disclosure relates to a method for use in a smart TV for introducing and playing a media.

2. Description of Related Art

With the popularity of smartphones, tablet PCs, small smart touch-screen devices, and other consumer electronic products, the screen size of smart electronic products is gradually changing from small to large, and smart TVs are being produced as required. Smart TVs require an LCD and a display chip, as in the case of traditional TVs, and in addition, they also allow for connecting to a network or the Internet, such that a variety of software can be built therein to provide for different uses. For example, social networking software, Internet browsers, audio-visual media, and game software can be pre-built in smart TVs, thereby realizing the combination of various functions of traditional televisions and computers in one device. In other words, smart TVs are not a one-way message trans fitter but instead are a two-way communication device.

The differences between smart TVs and general mobile phones and tablet computers include screen size and the application programs stored in these devices. Larger screens provide users with a better viewing experience, while application programs lead to new viewing habits.

However, the payment mechanisms of smart TVs vary a lot, and the actions required after payment are not the same. As a result, the user needs to learn and memorize a lot of paying procedures and related processes before application programs can be utilized. These procedures and processes are complicated and quite time consuming, which impose a great burden on users. Moreover, such procedures and processes run counter to the original leisure and entertainment purposes, which may lead to busy working people abandoning the use of smart TVs.

Therefore, an important issue is that related to facilitating the subscribing procedures and other processes of application programs and enabling users to use smart TVs in a more straightforward manner.

SUMMARY

According to one embodiment of the present disclosure, a method for introducing and playing a media is disclosed, in which the method is implemented through a display device that is capable of linking to a network or Internet. In the method, detection is performed to determine whether a display of the display device shows a channel preview frame, and a plurality of preliminary previews are automatically and sequentially played when the channel preview frame is showing on the display. Further, detection performed to determine whether a user selects one of the preliminary previews, and the user is provided with options of channel subscribing or detailed preview when the user selects one of the preliminary previews. Next, a fee paying procedure is executed when the user chooses to subscribe to the channel, and a channel information of the channel subscribed to is set.

According to another embodiment of the present disclosure, a computer readable storage medium employed for introducing and displaying a medium is disclosed. The computer readable storage medium includes a computer program which is loaded by an electronic device to execute the method as described in aforesaid embodiment.

According to still another embodiment of the present disclosure, an introducing and playing device is disclosed. The introducing and playing device includes a memory for storing a computer program, in which the method as described in aforesaid embodiment are executed when the computer program has been loaded and executed.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
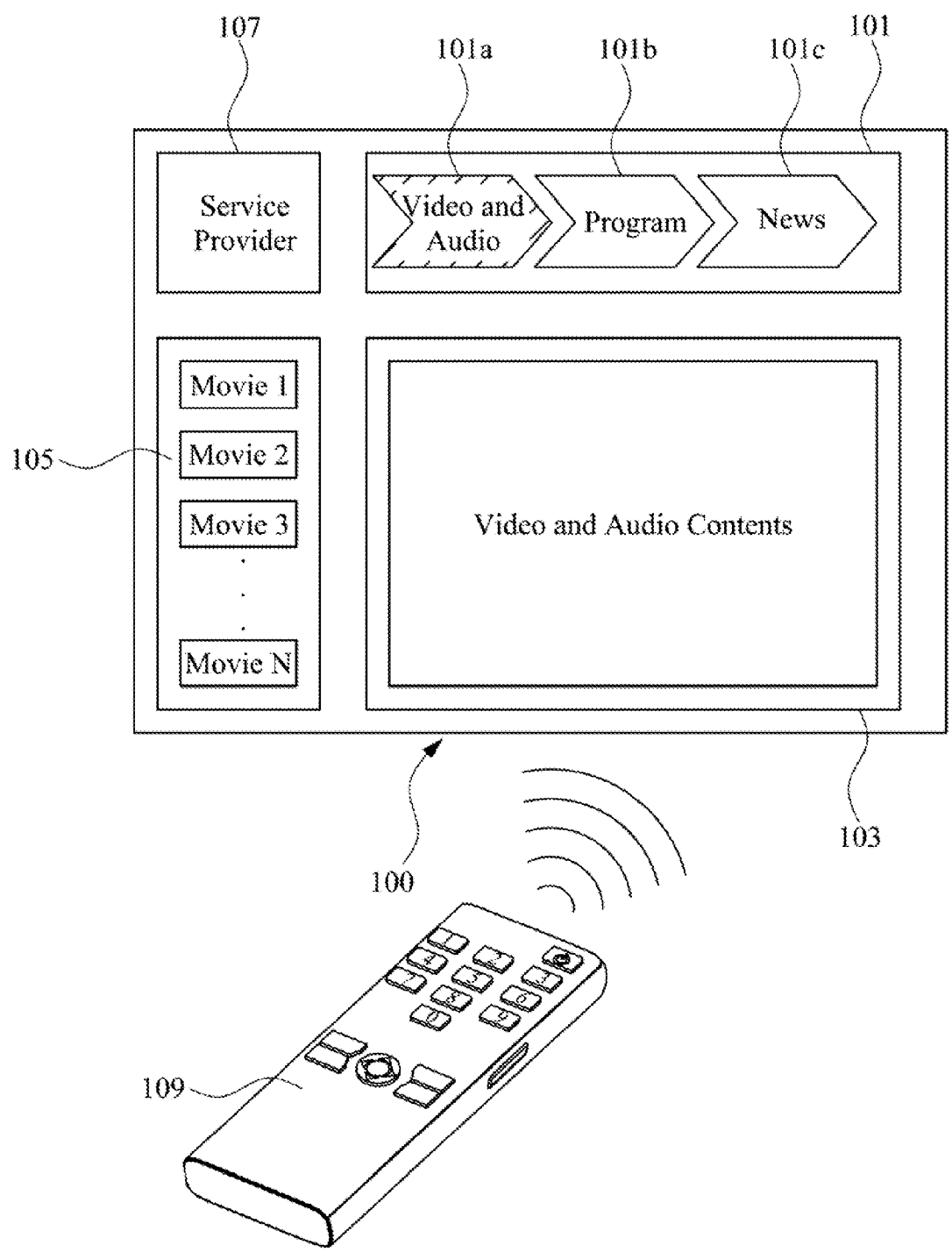
FIG. 1A, FIG. 1B, and FIG. 1C are diagrams of a channel preview frame and a remote controller according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

The method for introducing and playing a media of the following embodiments of the present disclosures enable users to perform a channel subscribing procedure in a more convenient and easy way. In particular, users can finish the subscribing process in one touch, that is, by pressing only one button, significantly reducing the burden on users. In addition, a computer readable storage medium can be utilized to store a computer program which is loaded by an electronic device to perform the aforesaid method. Another embodiment of the present disclosure provides an introducing and playing device which includes a memory to store the aforesaid computer program.

Figure 1B:
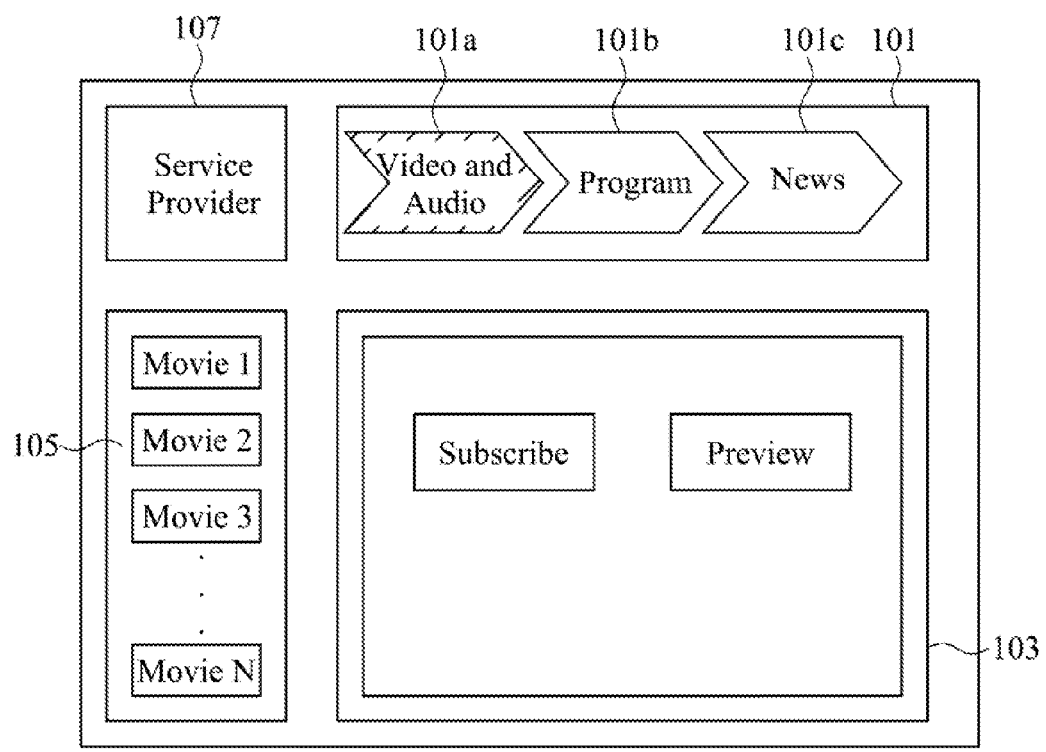
Figure 1C:
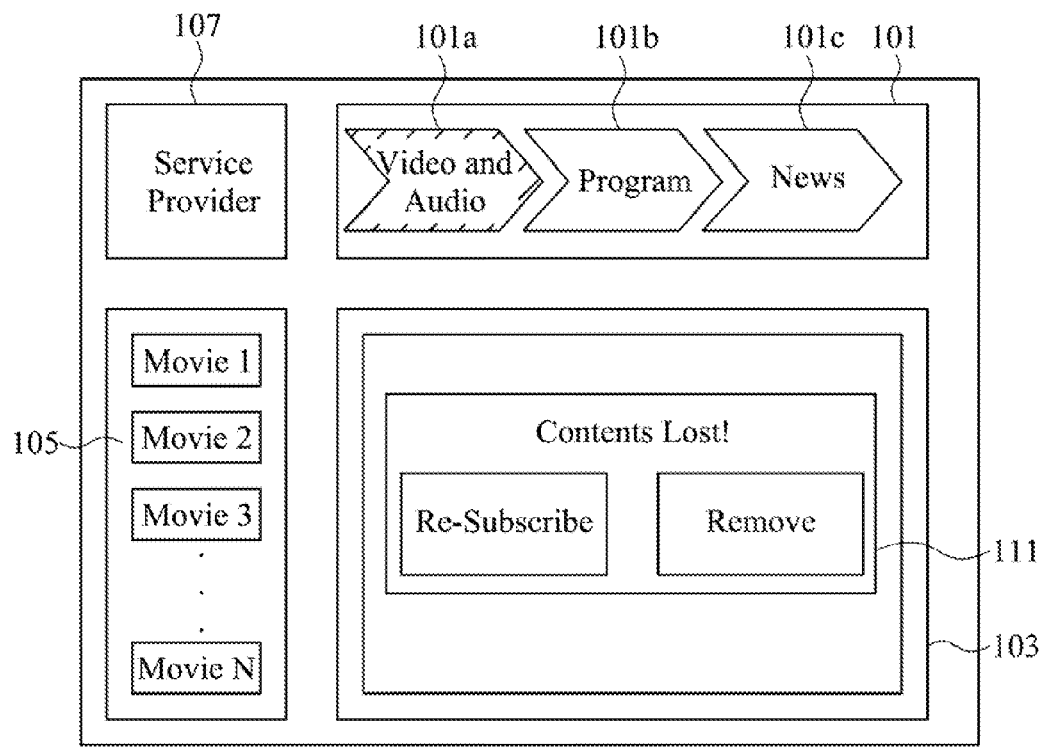

FIG. 1A, FIG. 1B, and FIG. 1C are diagrams of a channel preview frame and a remote controller according to one embodiment of the present disclosure. The channel preview frame 100 is shown on a display which can be an LCD, an electronic paper display, or a touch panel. Users can control the display through a remote controller 109, a mouse, a keyboard, or by touch control.

The channel preview frame 100 is divided into four blocks, in which block 107 displays a service provider, and block 101 displays a plurality of preview categories such as video and audio 101*a*, application program 101*b*, and news 101*c*. Preview contents and a preview listing corresponding to the preview categories are respectively displayed in the block 103 and the block 105. These three preview categories are automatically and sequentially displayed. When the display shows the channel preview frame 100, a smart TV automatically plays video and audio preliminary preview contents, and application program preliminary preview contents, such as logos of current popular application programs (APPs), are subsequently played (or displayed). For example, logos of Line, Subway Surfers, Angry Birds, Star Wars, and Cooking Master may be displayed. Next, news preliminary preview contents are played. For example, current breaking news and titles of headline news are played. After the preliminary preview contents respectively belonging to video and audio 101*a*, application program 101*b*, and news 101*c* are played once, the preliminary preview contents of all preview categories are repeatedly played if users have no further instruction. These movies, application programs, and news are automatically collected by service providers, and users do not need to search and collect these contents.

If the current displayed preliminary preview category is video and audio 101*a*, the video and audio 101*a* is marked by shadowing or highlighting to distinguish it from the other preview categories. Meanwhile, the preview listing in block 105 shows movie names of the movies that can be selected, such as "The Dark Knight Rises," "Step Up Revolution," and "The Amazing Spider Man." These movies are current popular titles automatically collected, and block 103 plays the preliminary preview contents or the detailed preview contents of these movies. The playing of preliminary preview contents of other categories is similar.

During the playing of the preliminary preview contents, if the user points to or stays on any of the preliminary preview contents through the remote controller 109, a mouse (not shown), or by touch control, corresponding channel subscribing or a detailed preview is entered. For example, if the user presses any button of the remote controller 109 when the preliminary preview contents of some movie is playing, block 103 will display button options of "subscribe" and "preview" for the user to choose. If the user chooses "preview" through the remote controller 109 or another device, a video and audio detailed preview contents is entered and an entire movie preview is played. If the user chooses "subscribe," procedures related to channel subscribing are automatically performed and completed. For instance, personal information of the user (e.g., account information and financial information) is provided to service providers, such that a service provider can charge the user and provide channel and corresponding channel number for the user. Hereafter, the user can input the channel number such as 11-1, 11-2, 11-3 simply through the remote controller or another device, and channel contents can be received. Therefore, the user only need to push the button once to subscribe to the desired contents, and he or she does not need to memorize a complicated system path, thereby saving time for the user and simplifying the subscription procedure.

Figure 2:
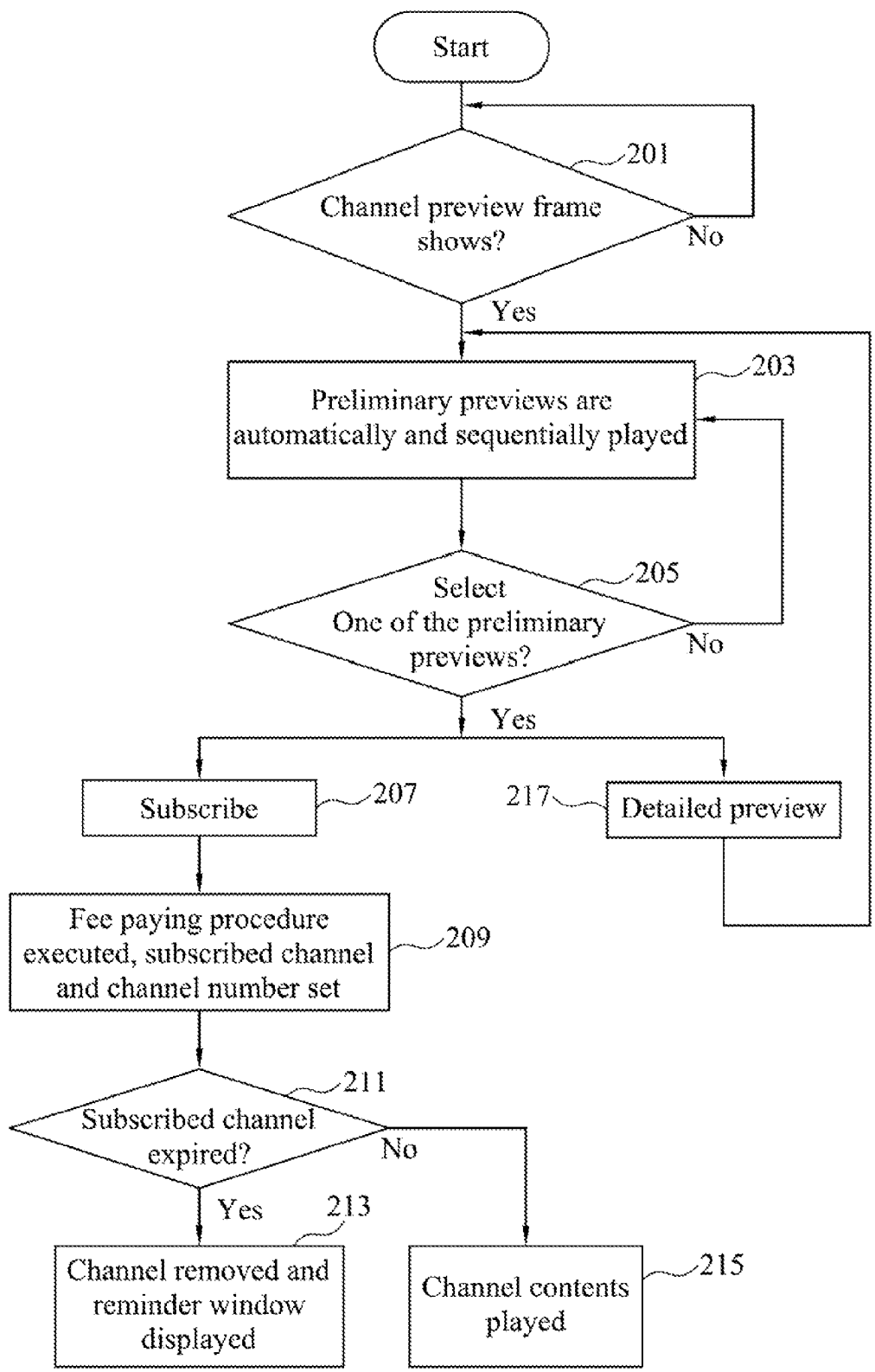
FIG. 2 is a flowchart of a method for introducing and playing a media according to one embodiment of this disclosure.

FIG. 2 is a flowchart of a method for introducing and playing a media according to one embodiment of this disclosure. The method for introducing and playing a media is implemented through a smart TV. In the method, detection is performed as to whether a display of the smart TV shows a channel preview frame (step 201). When the user switches the display to the channel preview frame, the video and audio preliminary preview, the application program preliminary preview, and the news preliminary preview are automatically and sequentially played (step 203), that is, the video and audio preliminary preview is played first, the application program preliminary preview is played second, and the news preliminary preview is played third. These three previews are repeatedly played.

The video and audio preliminary preview contents are automatically and sequentially played. Specifically, if there are twenty movies, the preliminary preview contents of these movies are played from the first to the last without stopping unless interrupted by the user. The preliminary preview contents of the next category, such as the preliminary preview contents of application programs, can be played only after these twenty preliminary preview contents finish playing. Similarly, the logos of popular applications are also automatically and sequentially displayed. In detail, several logos of application programs can be displayed on the same page. In some embodiments, the logos can be displayed using several pages in which one logo is displayed on each page. When the news preliminary preview contents are played, several popular news programs are sequentially played until current popular news finishes playing.

When the preliminary previews are played, detection is performed as to whether a user selects one of the preliminary previews (step 205). When the user selects one of the preliminary previews through pressing a button or by touching the displayed preliminary preview, the user is provided with options of channel subscribing or detailed preview shown on the screen, as shown in FIG. 1B. When the user chooses to subscribe to the channel (step 207), a fee paying procedure is executed (step 209). Account information and financial information of the user are stored in the display device or a remote storage apparatus in advance to allow for automatic transmission to a corresponding service provider (such as a server of a service provider) during the paying procedure. The service provider will record the subscribe request and the request submitting date for account processing. The service provider will provide corresponding information for review by the user. The service provider will process the playing time of the movie information, the off time, the actors, the photos, and the rating of the movie, such as General Audiences, Parental Guidance Suggested, Parents Strongly Cautioned, and Restricted. If the movie is identified as Restricted, the service provider will request the user to enter a password for verification. The movie is able to be played only when the password is correct.

The channel information of the newly subscribed channel and corresponding channel number is set in step 209. Hereafter, the channel subscribed to is checked to determine whether it has expired when the user input the channel number through a remote controller or other device (step 211).

When the channel has expired, the channel subscribed to is removed and a reminder window 111 for reminding the user to re-subscribe to the channel is displayed (step 213), as shown in FIG. 1C. When the service provider removes the channel, the removal action and the removal date are recorded for subsequent controlling of the viewing permit and account processing. After the channel is removed, the user is not able to view the channel. If the user re-subscribes to the channel, he or she does not need to go back to the database for searching the subscribed information to recover the channel, and instead, he or she can directly renew the channel, which makes the re-subscribe procedure more convenient. On the other hand, if the channel subscribed to has been determined to not be expired, the corresponding channel contents are played in step 215.

After step 205, when the user chooses the detailed preview (step 217), video and audio detailed preview contents, application program detailed preview contents, and news detailed preview contents are played. Further, video and audio detailed preview contents are the entire movie previews, while application program detailed preview includes a program explanation, a support level definition, a file size notification, a usage logo, and a usage film. Furthermore, the news detailed preview contents spread the entire news contents and the related movies, pictures, and websites. When the detailed preview contents finish playing, display returns back to the channel preview frame.

The method for introducing and playing a media of the above embodiment automatically plays all initial previews of all categories when the user stays in the content of interest. Users can subscribe to what they want by simply clicking the remote control with one touch, and a complicated subscribing procedure can be avoided, Users can access their subscribed contents by entering the channel number with the remote controller, and they no longer need to remember complicated system paths.

Users do not need to process expired channels, and the system will automatically remove such channels. Users are reminded to renew expired channels or to remove the channel number when users input an expired channel number through the remote controller. Users do not need to go back to a large database to find information already subscribed to, which simplifies the process of data reviewing and makes the usage more convenient.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for introducing and playing a media, implemented through a display device which is capable of linking to a network, the method comprising:
   detecting whether a display of the display device shows a channel preview frame;
   automatically and sequentially playing a plurality of preliminary previews according to a sequential order in one window when a user switches the display device to the channel preview frame and the channel preview frame is showing on the display; wherein after the preliminary previews are played once, the preliminary previews of all preview categories in the channel preview frame are repeatedly played when the display device does not receive any instruction from the user; wherein the preview categories comprise a video and audio category, an application program category and a news category; after all the preliminary previews of the video and audio category are sequentially displayed, the preliminary previews of the application program category are displayed automatically;
   detecting whether a user selects one of the preliminary previews;
   providing the user with options of channel subscribing to a channel or detailed preview when the user selects one of the preliminary previews;
   executing a fee paying procedure when the user chooses to subscribe to the channel; and
   setting a channel information of the channel subscribed to;
   wherein the preliminary previews comprise a video and audio preliminary preview, an application program preliminary preview, and a news preliminary preview;
   wherein a plurality of logos of a plurality of popular application programs are sequentially played when the application program preliminary preview is played; wherein the logos of the popular application programs are displayed using a plurality of pages, and each one of the logos is displayed on each one of the pages.

2. The method of claim 1, wherein account information and financial information of the user are stored in the display device or a remote storage apparatus for automatically transmitting to a corresponding service provider during the paying procedure.

3. The method of claim 1, wherein the channel preview frame comprises three blocks for respectively displaying a plurality of preview categories, a plurality of preview listings, and a plurality of preview contents.

4. The method of claim 1, wherein the logos for identifying business entities.

5. The method of claim 1, wherein a plurality of movie previews are sequentially played when the video and audio preliminary preview is playing.

6. The method of claim 1, wherein a plurality of popular news are broadcasted when the news preliminary preview is played.

7. The method of claim 1, wherein a video and audio detailed preview contents, an application program detailed preview contents, and a news detailed preview contents are played when the user choose the detailed preview.

8. The method of claim 7, wherein the application program detailed preview comprises a program explanation, a support level definition, a file size notification, a usage logo, and a usage film.

9. The method of claim 7, further comprising:
   returning back to the channel preview frame when the detailed preview contents finish playing.

10. The method of claim 1, wherein the channel information comprises a channel number.

11. The method of claim 10, further comprising:
   detecting whether a remote controller has outputted the channel number; and
   playing corresponding channel contents when the channel number has been outputted.

12. The method of claim 1, further comprising:
   checking if the channel subscribed to has expired;
   removing the channel subscribed to and displaying a reminder window for reminding the user to re-subscribe to the channel the when the channel has expired; and
   playing the corresponding channel contents when the channel subscribed to has not expired.

13. A non-transitory computer readable storage medium employed for introducing and displaying a medium, wherein the computer readable storage medium comprises a computer program which is loaded by a smart TV to execute a method, the method comprising:
   detecting whether a display of the display device shows a channel preview frame;
   automatically and sequentially playing a plurality of preliminary previews according to a sequential order in one window when the channel preview frame is showing on the display; wherein after the preliminary previews are played once, the preliminary previews of all preview categories in the channel preview frame are repeatedly played when the display device does not receive any instruction from a user; wherein the preview categories comprise a video and audio category, an application program category and a news category; after all the preliminary previews of the video and audio category are sequentially displayed, the preliminary previews of the application program category are displayed automatically;

detecting whether a user selects one of the preliminary previews;

providing the user with options of channel subscribing to a channel or detailed preview when the user selects one of the preliminary previews;

executing a fee paying procedure when the user chooses to subscribe to the channel; and setting a channel information of the channel subscribed to;

wherein the preliminary previews comprise a video and audio preliminary preview, an application program preliminary preview, and a news preliminary preview;

wherein a plurality of logos of a plurality of popular application programs are sequentially played when the application program preliminary preview is played; wherein the logos of the popular application programs are displayed using a plurality of pages, and each one of the logos is displayed on each one of the pages.

14. A introducing and playing device, comprising a memory for storing a computer program, wherein the method of claim 1 is executed when the computer program has been loaded and executed.

* * * * *